(12) United States Patent
Koishikawa et al.

(10) Patent No.: US 10,046,821 B2
(45) Date of Patent: Aug. 14, 2018

(54) SADDLE TYPE VEHICLE

(71) Applicant: HONDA MOTOR CO., LTD., Tokyo (JP)

(72) Inventors: Takuma Koishikawa, Wako (JP); Yoshiki Higashijima, Wako (JP); Toru Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 21 days.

(21) Appl. No.: 15/281,871

(22) Filed: Sep. 30, 2016

(65) Prior Publication Data

US 2017/0101148 A1 Apr. 13, 2017

(30) Foreign Application Priority Data

Oct. 9, 2015 (JP) .................. 2015-201592

(51) Int. Cl.
*B62J 15/02* (2006.01)
*B62J 99/00* (2009.01)
*B62K 11/04* (2006.01)
*B62K 25/04* (2006.01)

(52) U.S. Cl.
CPC .............. *B62J 15/02* (2013.01); *B62J 99/00* (2013.01); *B62K 11/04* (2013.01); *B62K 25/04* (2013.01); *B62J 2099/004* (2013.01)

(58) Field of Classification Search
CPC ...... B62J 15/02; B62J 99/00; B62J 2099/004; B62K 11/04; B62K 25/04
See application file for complete search history.

(56) References Cited

U.S. PATENT DOCUMENTS

| | | | | |
|---|---|---|---|---|
| 6,257,362 B1 * | 7/2001 | Scherbarth | ............... | B62J 15/02 180/219 |
| 6,318,743 B1 * | 11/2001 | Nakashima | ............... | B62J 15/00 180/219 |
| 6,520,275 B2 * | 2/2003 | Galbraith | ................... | B62J 9/00 180/219 |
| 6,585,072 B2 * | 7/2003 | Scherbarth | ............... | B62J 15/02 180/219 |
| 7,036,837 B1 * | 5/2006 | Bauer | ...................... | B62J 15/02 180/219 |

(Continued)

FOREIGN PATENT DOCUMENTS

| | | |
|---|---|---|
| JP | 7-101369 A | 4/1995 |
| JP | 10-318066 A | 12/1998 |
| JP | 2006-315477 A | 11/2006 |

*Primary Examiner* — Joseph M Rocca
*Assistant Examiner* — Michael R Stabley
(74) *Attorney, Agent, or Firm* — Birch, Stewart, Kolasch & Birch, LLP

(57) ABSTRACT

A saddle type vehicle wherein the supporting rigidity of a rear fender frame is enhanced while securing a degree of freedom of a shape of a vehicle body frame main body. A shock absorber bracket wherein an upper end portion of a rear shock absorber for supporting a rear wheel thereon is coupled and attached to a vehicle body frame main body. A rear fender frame includes a plurality of supported portions in a front region thereof. At least part of the plurality of supported portions is co-fastened to the shock absorber bracket together with the upper end portion of the rear shock absorber, and the remaining supported portions are fixed to the vehicle body frame main body.

14 Claims, 11 Drawing Sheets

(56) References Cited

U.S. PATENT DOCUMENTS

| | | | | |
|---|---|---|---|---|
| 7,793,747 B2* | 9/2010 | Brown | ............... | B62J 9/001 |
| | | | | 180/219 |
| 8,459,393 B2* | 6/2013 | Yamamoto | ............... | B62J 15/00 |
| | | | | 180/219 |
| 8,579,063 B2* | 11/2013 | Smith | ............... | B62K 11/04 |
| | | | | 180/219 |
| 8,851,496 B2* | 10/2014 | Hedtke | ............... | B62K 11/04 |
| | | | | 180/219 |
| 8,851,557 B2* | 10/2014 | Koyama | ............... | B62J 15/00 |
| | | | | 296/198 |
| 2005/0062278 A1* | 3/2005 | Griffin | ............... | B62J 15/02 |
| | | | | 280/847 |
| 2014/0063825 A1* | 3/2014 | Nakamura | ............... | B62D 25/16 |
| | | | | 362/473 |
| 2014/0262580 A1* | 9/2014 | Bagnariol | ............... | B60G 7/006 |
| | | | | 180/218 |
| 2015/0130209 A1* | 5/2015 | Hamlin | ............... | B62J 17/02 |
| | | | | 296/78.1 |

* cited by examiner

SADDLE TYPE VEHICLE

CROSS-REFERENCE TO RELATED APPLICATIONS

The present application claims priority under 35 USC 119 to Japanese Patent Application No. 2015-201592 filed Oct. 9, 2015 the entire contents of which are hereby incorporated by reference.

BACKGROUND OF THE INVENTION

1. Field of the Invention

The present invention relates to a saddle type vehicle including a rear fender that covers an upper portion of a rear wheel.

2. Description of Background Art

In a saddle type vehicle such as a motorcycle, a rear fender that covers an upper portion of a rear wheel is provided in order to prevent upward scatting of rainwater, gravel, dust or the like stirred up from the rear wheel during operation of the vehicle. A saddle type vehicle is known wherein a rear fender frame, configured from a plate member or the like having high rigidity, is attached to a vehicle body frame main body and a rear fender is supported on the rear fender frame. See, for example, Japanese Patent Laid-Open No. 2006-315477.

In the saddle type vehicle disclosed in Japanese Patent Laid-Open No. 2006-315477, three bolt fastening portions are provided at each of left and right sides at a position just under a seat of a vehicle body frame main body and a front region of the rear fender frame is fixed to the bolt fastening portions. In order to support the rear fender frame on the vehicle body frame main body with a high rigidity, the three bolt fastening portions provided at each of the left and right sides of the vehicle body frame main body are disposed at positions spaced away from each other in the forward and rearward directions and the upward and downward directions.

However, in the saddle type vehicle disclosed in Japanese Patent Laid-Open No. 2006-315477, in order to obtain a suitable supporting rigidity of the rear fender frame, the three bolt fastening portions at each of the left and right sides are set in a spaced relationship from each other on a pipe member of the vehicle body frame main body. Therefore, if it is tried to further enhance the supporting rigidity of the rear fender frame, then the degree of freedom of the shape of the vehicle body frame main body is restricted.

SUMMARY AND OBJECTS OF THE INVENTION

Therefore, it is an object of an embodiment of the present invention to provide a saddle type vehicle that can enhance the supporting rigidity of a rear fender frame while securing a degree of freedom of the shape of a vehicle body frame main body.

In order to solve the problem described above, according to an embodiment of the present invention, there is provided a saddle type vehicle including a rear fender (50) that covers an upper portion of a rear wheel (Wr), a vehicle body frame main body (14, 15, 16) with regard to which at least part of the main body is disposed above a front portion of the rear wheel (Wr), and a rear fender frame (60) that supports the rear fender (50) in a state in which a front region is attached to the vehicle body frame main body (14, 15, 16), wherein a shock absorber bracket (28) with which an upper end portion of a rear shock absorber (9), for supporting the rear wheel (Wr), is attached to the vehicle body frame main body (14, 15, 16). The rear fender frame (60) includes a plurality of supported portions (62a, 62b, 62c) in a front region, and at least part (62c) of the plurality of supported portions (62a, 62b, 62c) is co-fastened to the shock absorber bracket (28) together with an upper end portion of the rear shock absorber (9). The remaining supported portions (62a, 62b) are fixed to the vehicle body frame main body (14, 15, 16).

According to an embodiment of the present invention, the front region of the rear fender frame (60) is fixed to the vehicle body frame main body (14, 15, 16) and the shock absorber bracket (28) is attached to the vehicle body frame main body (14, 15, 16). Further, the front region of the rear fender frame (60) is co-fastened together with an upper end portion of the rear shock absorber (9) through common fastening means to the shock absorber bracket (28).

The remaining supported portions (62a, 62b) may be fixed to an inner side portion in a vehicle widthwise direction of the vehicle body frame main body (14, 15, 16).

According to an embodiment of the present invention, since the outer side in the vehicle widthwise direction of the remaining supported portions (62a, 62b) is covered with the vehicle body frame main body (14, 15, 16), the remaining supported portions (62a, 62b) are less likely to be viewed from the outside. Thus, the appearance is improved.

The rear fender frame (60) may include a pair of left and right side frame portions (60L, 60R) that are disposed on both sides in the vehicle widthwise direction and a cross frame portion (60F) that couples the side frame portions (60L, 60R) with each other. At least part of the cross frame portion (60F) may be configured from a seat supporting plate (60S) that supports a lower face at a rear side of a seat (20) on which an occupant is seated.

According to an embodiment of the present invention, since the pair of side frame portions (60L, 60R) are coupled with each other by the seat supporting plate (60S), the lower face at the rear side of the seat (20) can be stably supported by the seat supporting plate (60S). Thus, the rigidity of the rear fender frame (60) can be enhanced. Further, since the number of members is reduced in comparison with that in an alternative case in which the seat supporting plate (60S) that supports the lower face at the rear side of the seat (20) and a member for coupling the pair of side frame portions (60L, 60R) are provided separately from each other, a reduction in the cost of fabrication and a reduction in the weight of the vehicle can be implemented.

The seat supporting plate (60S) may be formed in a substantially box-like shape open downwardly.

According to an embodiment of the present invention, the rigidity of the seat supporting plate (60S), particularly, the rigidity in the twisting direction, is enhanced and a different member can be easily disposed at the lower face side of the seat supporting plate (60S).

The cross frame portion (60F) may include a battery box (70) that is attached in proximity of an installation portion of the seat supporting plate (60S) from within a front edge portion of the pair of left and right side frame portion (60L, 60R) and accommodates a battery inside thereof. An electrical component (61) may be disposed on a lower face of the seat supporting plate (60S).

According to an embodiment of the present invention, since the front edge portions of the pair of the side frame portions (60L, 60R) are coupled with each other in parallel to each other by the seat supporting plate (60S) and the battery box (70), the rigidity of the front edge portion of the rear fender frame (60) can be enhanced with a high efficiency. Further, since the battery accommodated in the battery box (70) and the electrical component (61) disposed on the lower face of the seat supporting plate (60S) are disposed in a neighboring relationship with each other, a battery harness (75) that couples the battery and the electrical component (61) with each other can be configured to be shorter. Further, since the electrical component (61) is disposed on the lower face of the seat supporting plate (60S), the electrical component (61) can be protected by the seat supporting plate (60S) while effectively utilizing a space below the seat supporting plate (60S).

The battery box (70) may include a box main body portion (70a) that accommodates the battery inside thereof and an inclined wall portion (70b) that extends obliquely rearwardly and upwardly from a rear portion of the box main body portion (70a) and covers a lower portion of the electrical component (61).

According to an embodiment of the present invention, since the inclined wall portion (70b) of the battery box (70) covers the lower portion of the electrical component (61), it can prevent rainwater, gravel, dust or the like stirred up from the rear wheel (Wr) upon the operation of the vehicle from scattering to the electrical component (61).

The vehicle body frame main body (14, 15, 16) may include a pair of left and right seat frame portions (23L, 23R) that extend from a lower front position of the seat (20) toward a rear position of the seat (20) and a pair of left and right seat sub frame portions (24L, 24R) that extend from the seat frame portions (23L, 23R) toward the upper front side and support a lower face of a side portion at a front side of the seat (20). Further, the seat supporting plate (60S) that supports the lower face at a rear side of the seat (20) may be disposed between the pair of left and right seat frame portions (23L, 23R). Further, the seat sub frame portions (24L, 24R) may extend from a lower front position (P) than a portion of the seat frame portions (23L, 23R) at which the seat supporting plate (60S) is disposed toward the upper front side.

According to an embodiment of the present invention, the extended length of the seat sub frame portions (24L, 24R) that support the lower face of a side portion at the front side of the seat (20) can be reduced in comparison with that in an alternative case in which the seat sub frame portions (24L, 24R) extend forwardly in a substantially horizontal direction from a proximal portion of a portion on the seat frame portions (23L, 23R) at which the seat supporting plate (60S) is disposed. Accordingly, by adopting the configuration just described, not only is there a reduction in the weight of the seat sub frame portions (24L, 24R) but also there is a reduction in the weight of the vehicle.

According to an embodiment of the present invention, since the front region of the rear fender frame is fixed to the vehicle body frame main body and the shock absorber bracket attached to the vehicle body frame main body, the supporting rigidity of the rear fender frame can be enhanced without limiting the degree of freedom of the shape of the vehicle body frame main body.

According to an embodiment of the present invention, since the front region of the rear fender frame is co-fastened to the shock absorber bracket together with an upper end portion of the rear shock absorber, the number of parts of the fastening members can be decreased and the rear fender frame and the rear shock absorber can be assembled with a high efficiency with the vehicle body frame main body side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
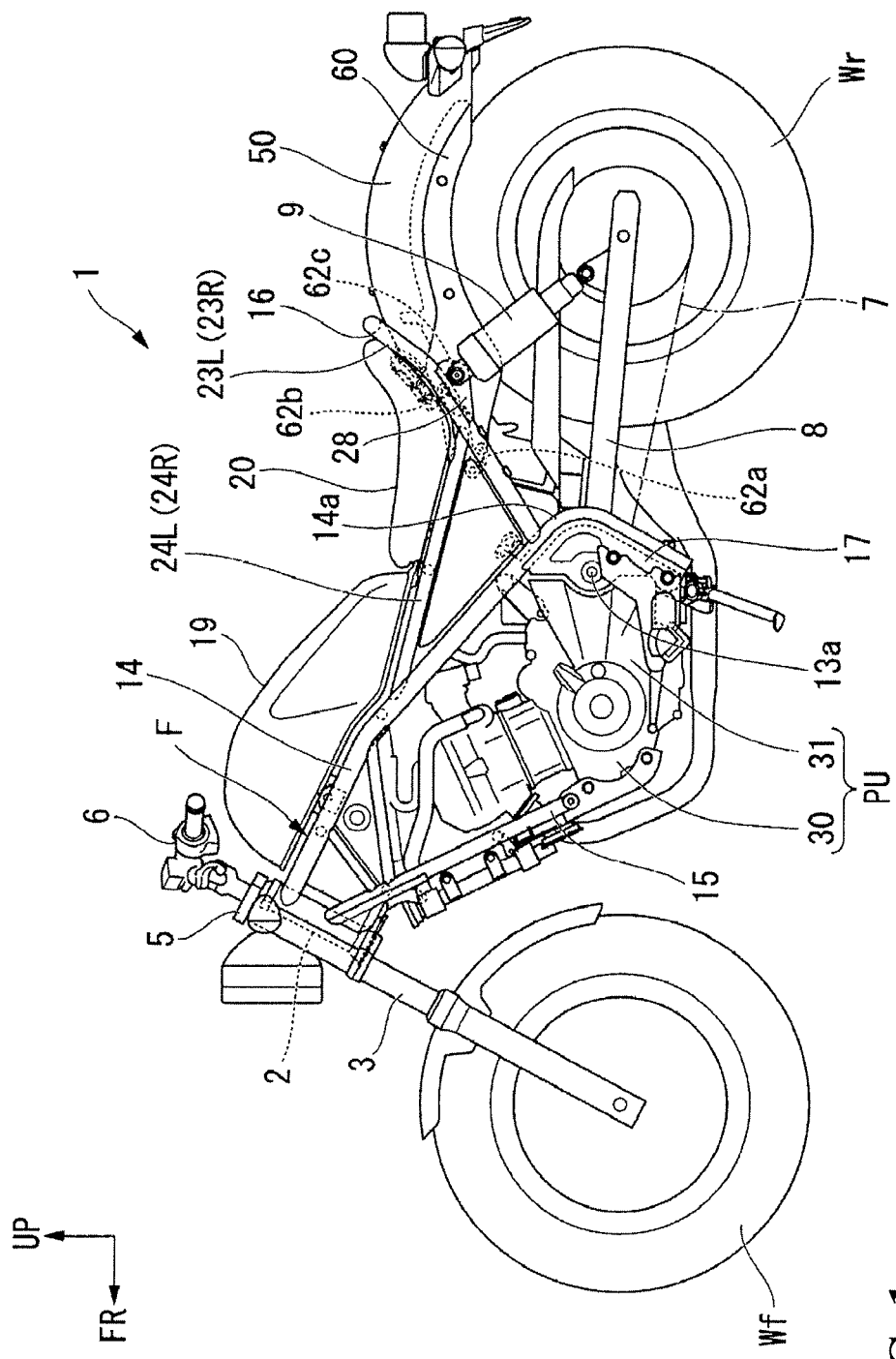
FIG. 1 is a side elevational view of a saddle type vehicle according to an embodiment of the present invention.

In the following, an embodiment of the present invention is described with reference to the drawings. It is to be noted that, unless otherwise specified, the forward, rearward, leftward, and rightward directions and so forth in the following description are same as those as viewed from a vehicle direction. Further, arrow mark FR indicates the forward direction of the vehicle, another arrow mark LH indicates the leftward of the vehicle, and a further arrow mark UP indicates the upward direction of the vehicle are given at suitable locations in the drawings and are referred to the following description.

FIG. 1 is a view depicting a left side face of the saddle type vehicle according to the embodiment. The saddle type vehicle according to the embodiment is a motorcycle 1 in which the height of the vehicle is decreased and the length in the forward and rearward direction is increased. The motorcycle 1 is a so-called cruiser type motorcycle. A front wheel Wf of the motorcycle 1 is supported for rotation at a lower end portion of a pair of left and right front forks 3. The left and right front forks 3 are supported on a head pipe 2 at a front end portion of a vehicle body frame F through a steering stem not depicted and a top bridge 5. A bar-type steering handlebar 6 is attached to the top bridge 5.

A rear wheel Wr of the motorcycle 1 is supported at a rear end portion of a swing arm 8. A front end portion of the swing arm 8 is supported for upward and downward rocking motion at a pivot portion 13*a* of the vehicle body frame F. The rear wheel Wr is linked with an engine 30 that is a prime mover of the motorcycle 1, for example, through a transmission mechanism by a chain 7 or the like. A lower end portion of a rear shock absorber 9 that is a suspension part at the rear wheel Wr side is coupled in the proximity of a rear wheel supporting portion of the swing arm 8.

Figure 2:
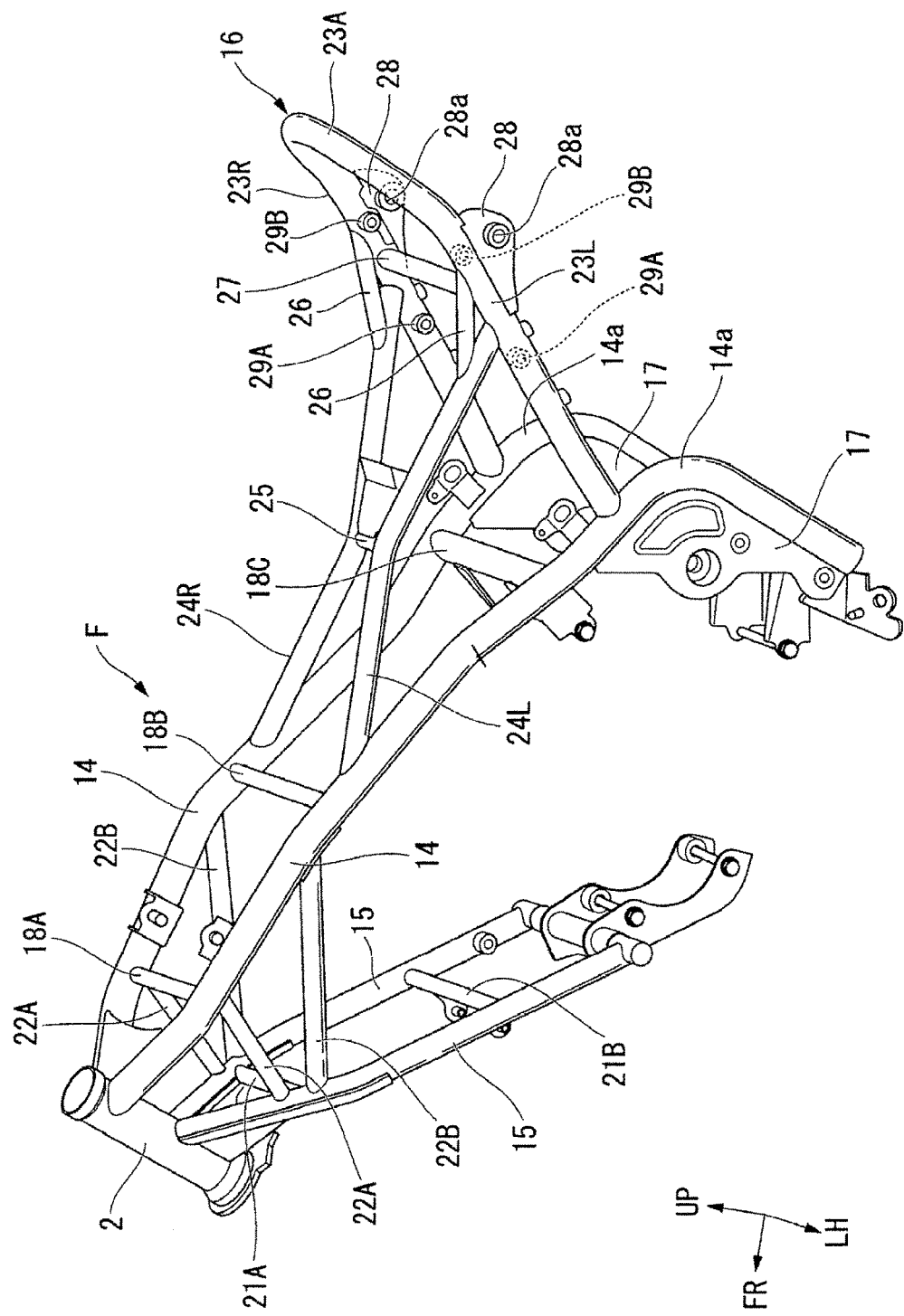
FIG. 2 is a perspective view depicting a vehicle body frame of the saddle type vehicle according to the embodiment of the present invention.
Figure 3:
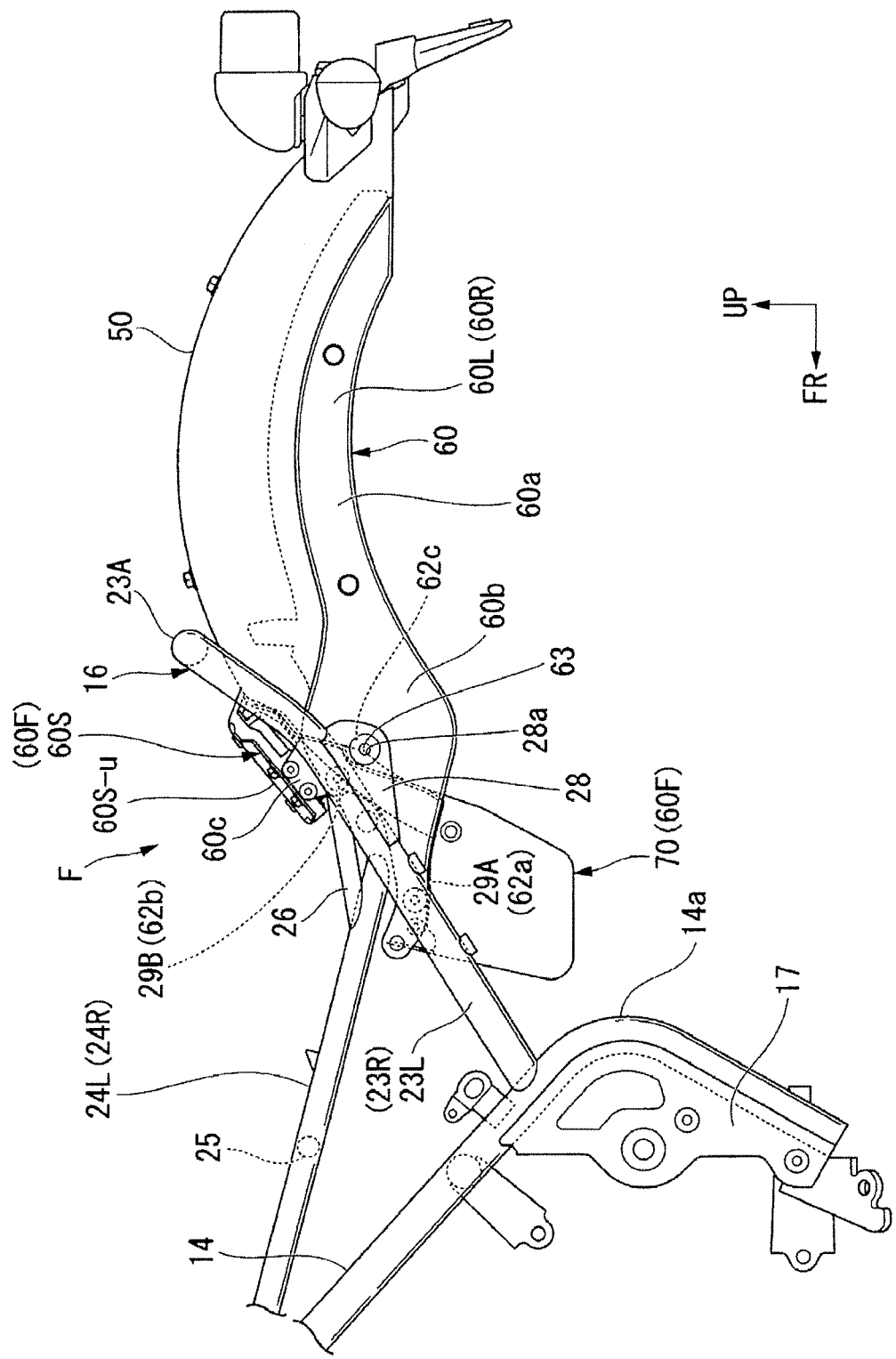
FIG. 3 is a side elevational view depicting the vehicle body frame of the saddle type vehicle according to the embodiment of the present invention.

FIGS. 2 and 3 are views depicting a main portion of the vehicle body frame F of the motorcycle 1.

As depicted in FIGS. 2 and 3, the vehicle body frame F includes the head pipe 2, a pair of left and right main frames 14, a pair of left and right down frames 15, a rear frame 16, and a rear fender frame 60. The head pipe 2 supports thereon the steering stem, not depicted, which is positioned at a front end portion of the body frame F. The pair of left and right main frames 14 are branched leftwardly and rightwardly from the rear of an upper portion of the head pipe 2 and extend rearwardly and downwardly as viewed in a side elevational view and further extend in a state in which the direction thereof is changed downwardly at a rear curved portion 14*a*. The pair of left and right down frames 15 are branched leftwardly and rightwardly from the rear of a lower portion of the heat pipe 2 and extend rearwardly downwardly in a steeply inclined state rather than the main frames 14 as viewed in a side elevational view. The rear frame 16 is coupled with the upper rear face side of the left and right main frames 14. The rear fender frame 60 has a front region coupled with the rear frame 16 and supports thereon a rear fender 50 for covering the upper side of the rear wheel Wr. It is to be noted that, in FIG. 2, the illustration of the rear fender frame 60 is omitted.

The left and right main frames 14 and the left and right down frames 15 are each formed by bending work of a round steel pipe. As viewed in a top plan view, the left and right main frames 14 are curved from a joining portion thereof with the head pipe 2 at a front end portion to the outer sides in the vehicle widthwise direction until the spacing width between the left and right main frames 14 is fixed once. Further, the spacing width between the left and right main frames 14 is reduced toward a proximal portion of the rear curved portion 14*a*, and the spacing width is increased downwardly again from the proximal portion of the rear curved portion 14*a*. The left and right main frames 14 are coupled with each other by a plurality of cross pipes 18A, 18B, and 18C. A front region of a fuel tank 19 is disposed above a region in which the spacing width at the front side of the left and right main frames 14 is great, and a rear region of the fuel tank 19 and a seat 20 on which an occupant is to be seated are disposed through the rear frame 16 above a region in which the spacing width at the rear side of the left and right main frames 14 is small.

Further, a pivot plate 17 is attached to the rear curved portion 14*a* of the left and right main frames 14 and a lower region of the rear curved portion 14*a*. The pivot portion 13*a* is attached to the pivot plate 17 and supports the front end portion of the swing arm 8 thereon.

The left and right down frames 15 are coupled with each other by a plurality of cross pipes 21A and 21B, and an upper side region thereof is coupled with the front region of the left and right main frames 14 by gusset frames 22A and 22B.

A power unit PU in which the engine 30 and a gearbox 31 are integrated is disposed in a region surrounded by the down frames 15 and the main frames 14. The power unit PU is attached to the down frames 15 and the main frames 14 and configures part of the vehicle body frame F.

Figure 4:
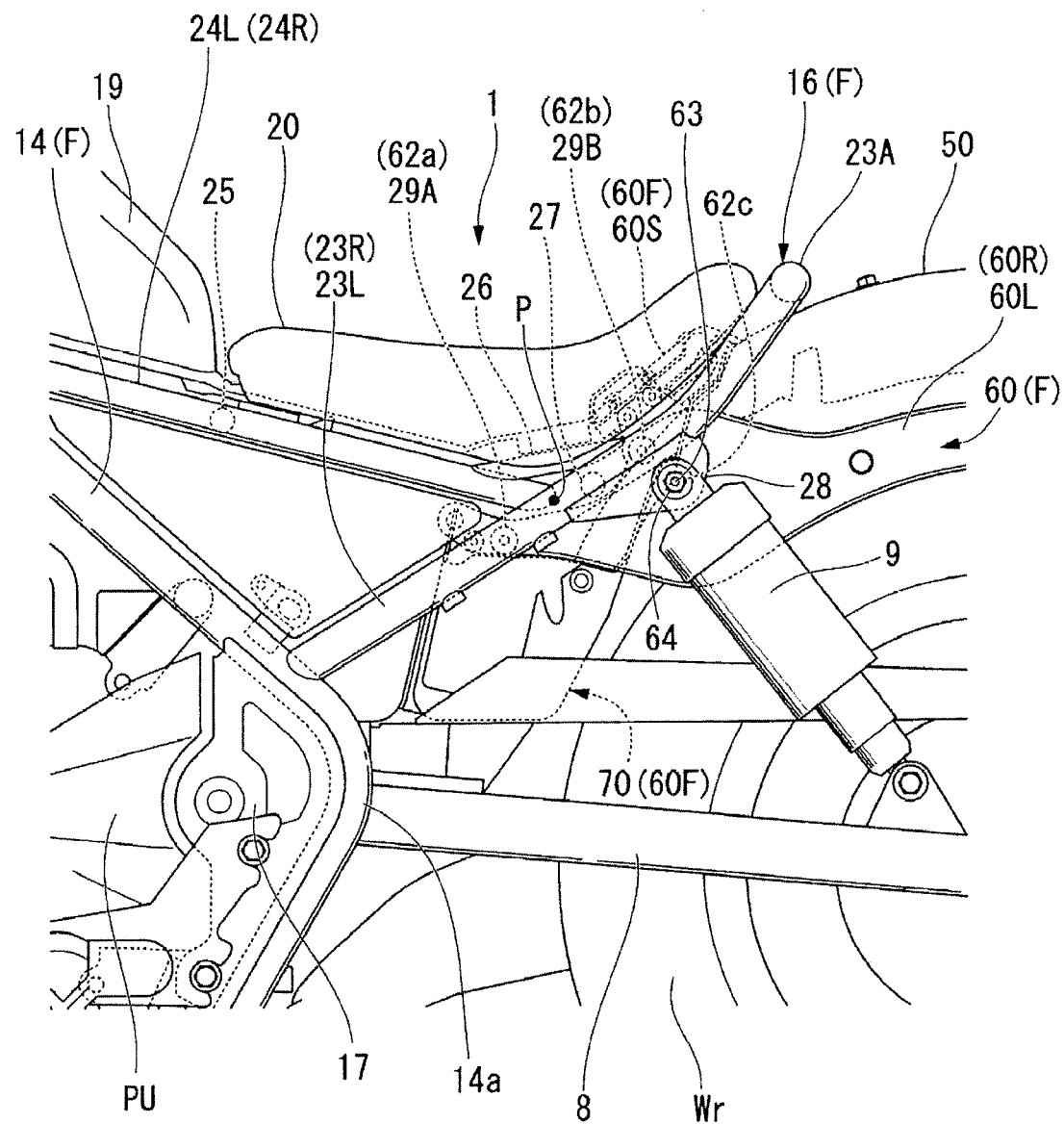
FIG. 4 is a side elevational view of the saddle type vehicle according to the embodiment of the present invention.
Figure 5:
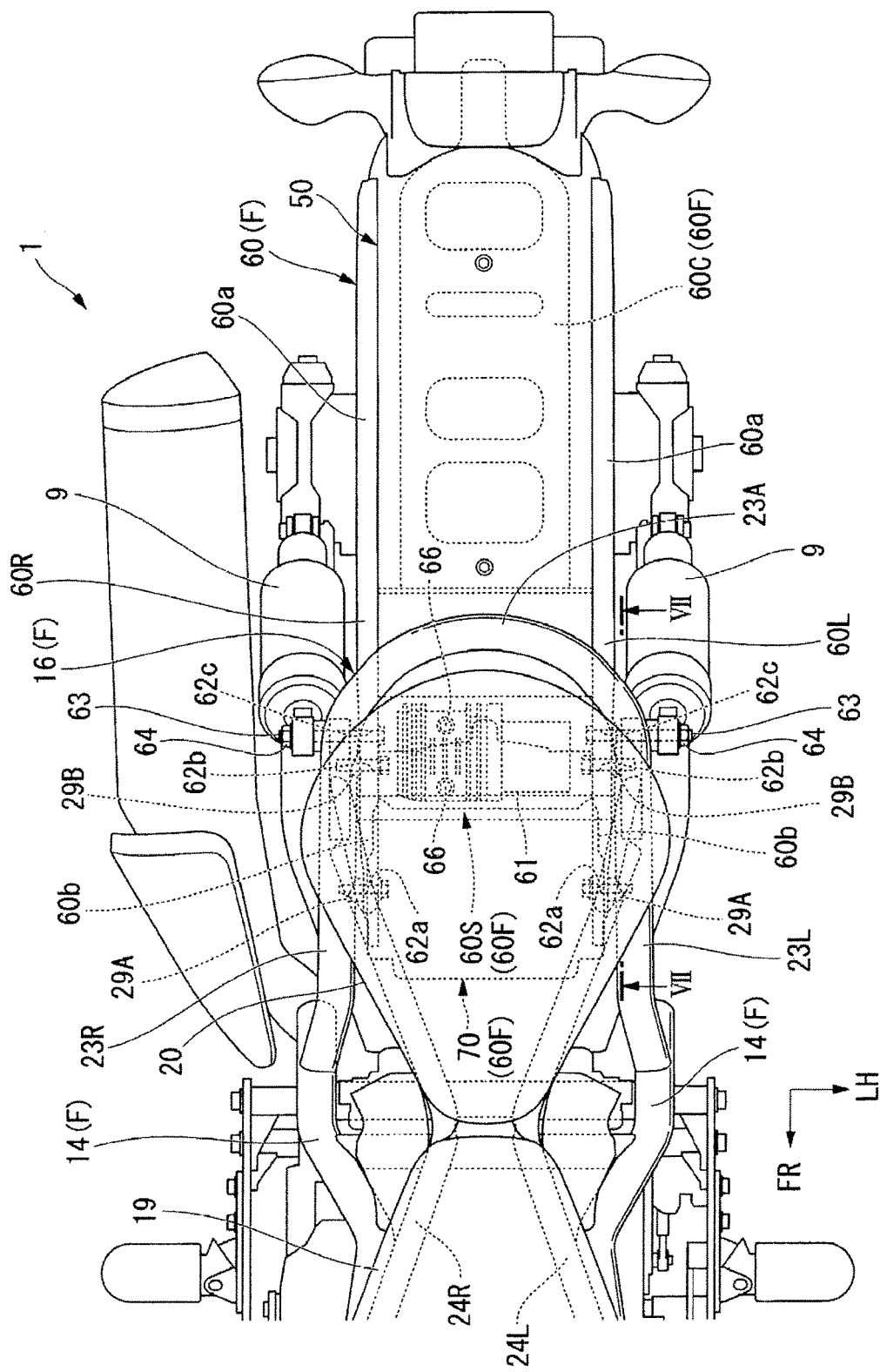
FIG. 5 is a top plan view of the saddle type vehicle according to the embodiment of the present invention.
Figure 6:
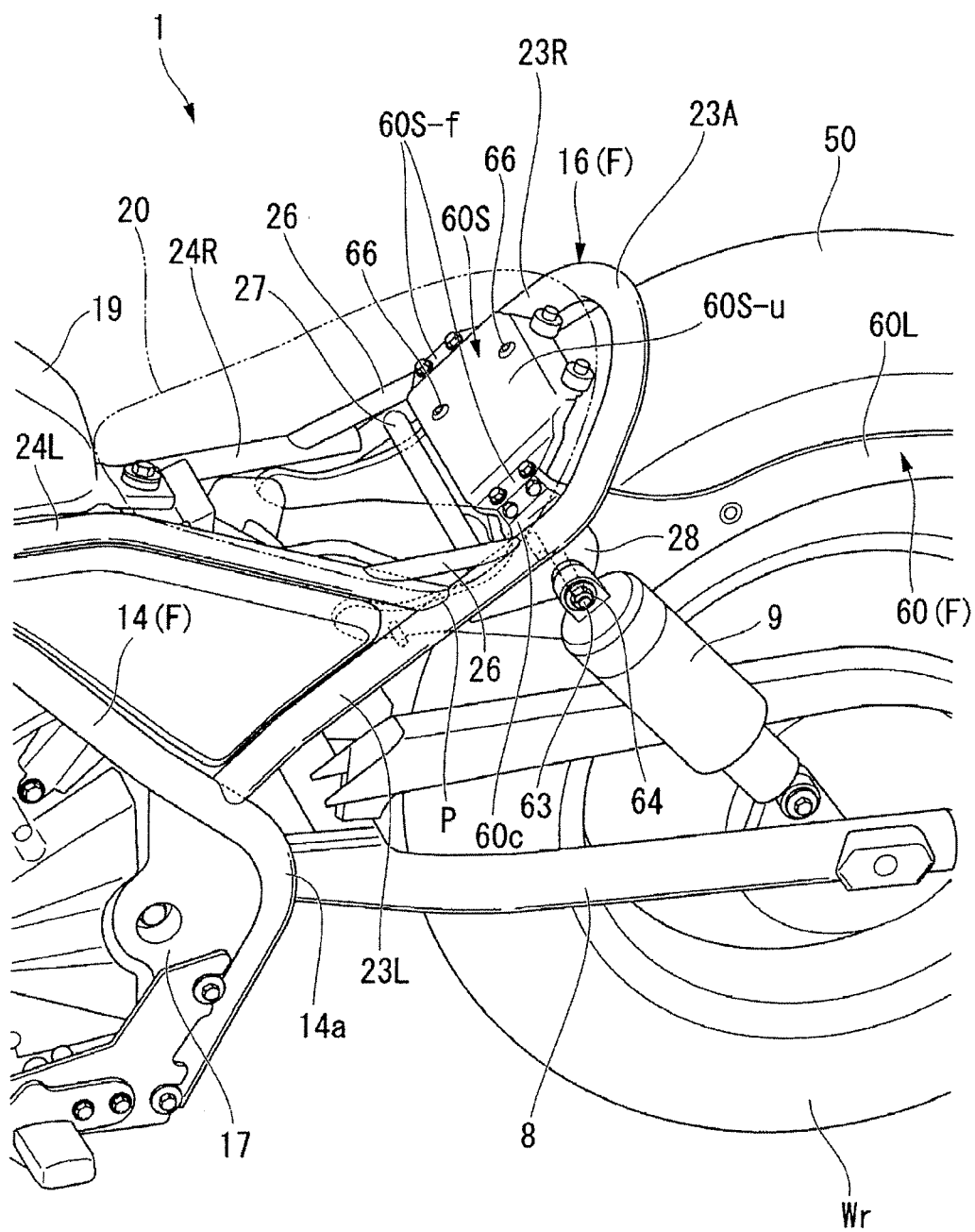
FIG. 6 is a perspective view of the saddle type vehicle according to the embodiment of the present invention.
Figure 7:
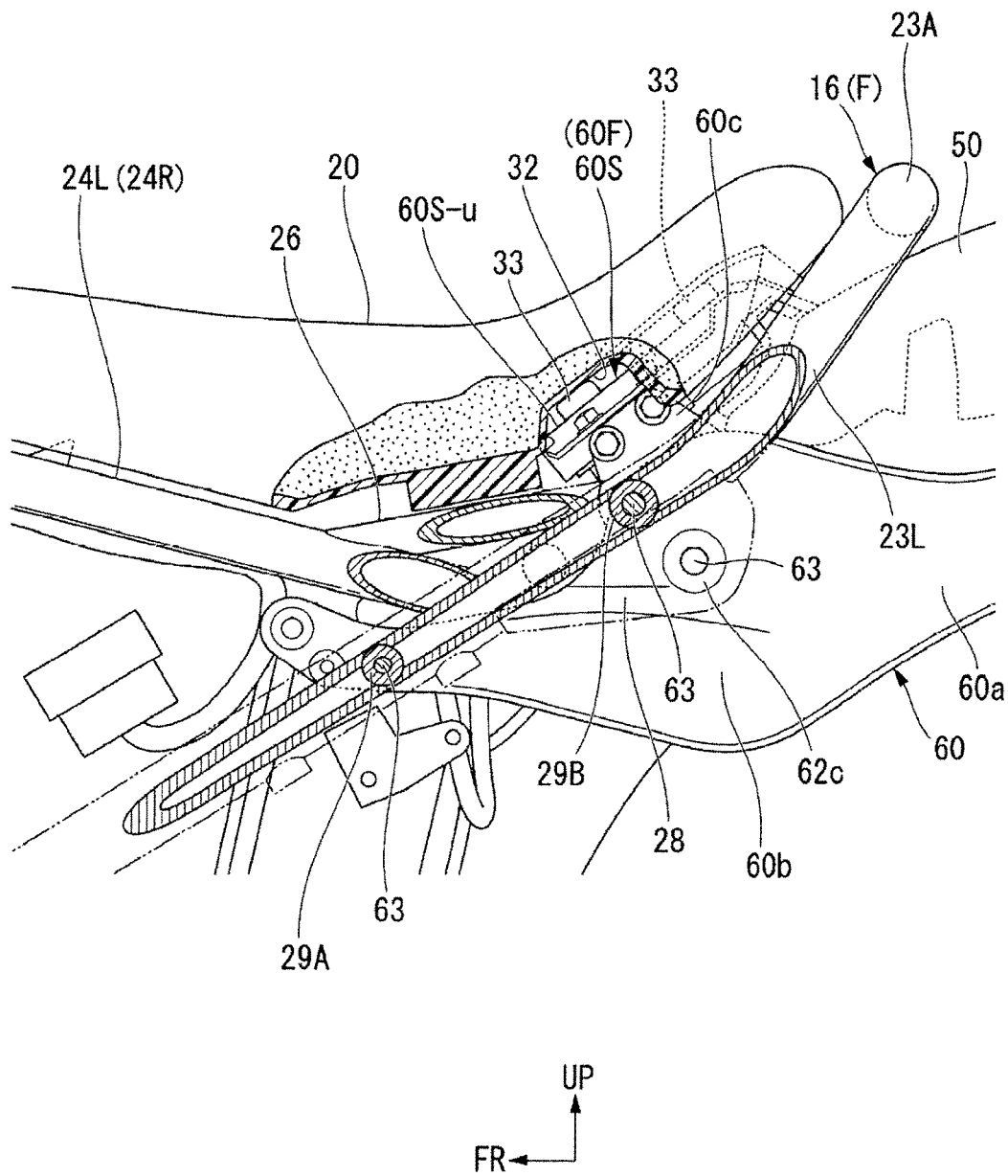
FIG. 7 is a sectional view of the saddle type vehicle according to the embodiment of the present invention taken along line VII-VII of FIG. 5.

FIG. 4 is a view depicting part of a left side face of the motorcycle 1 in an enlarged scale, and FIG. 5 is a view of part of an upper face of the motorcycle 1 in an enlarged scale. Further, FIG. 6 is a view of the motorcycle 1 as viewed from the upper front left side in a state in which the seat 20 is removed, and FIG. 7 is a sectional view taken along line VII-VII of FIG. 5.

As depicted in FIGS. 4 to 7, the rear frame 16 includes a pair of left and right seat frame portions 23L and 23R and a coupling portion 23A. The pair of left and right seat frame portions 23L and 23R extend rearwardly and upwardly (extending toward a rear position of the seat 20) from an upper face in the proximity of the rear curved portion 14*a* of the left and right main frames 14. The coupling portion 23A couples rear portions of the left and right seat frame portions 23L and 23R with each other and is curved in a substantially U-shape. In the present embodiment, the left and right seat frame portions 23L and 23R and the coupling portion 23A are formed integrally by bending a round steel pipe. However, the left and right seat frame portions 23L and 23R and the coupling portion 23A may be configured by members separate from each other.

Further, the rear frame 16 includes a pair of left and right seat sub frame portions 24L and 24R that extend from a substantially intermediate position in the extending direction of the left and right seat frame portions 23L and 23R to the upper front side and are coupled at a front end portion thereof with the left and right main frames 14.

In the present embodiment, while the left and right seat frame portions 23L and 23R are individually formed from a large-diameter round steel pipe similar to that configuring the main frames 14, the left and right seat sub frame portions 24L and 24R are each formed from a small-diameter round steel pipe in comparison with that for the left and right seat frame portions 23L and 23R.

Further, while the left and right seat sub frame portions 24L and 24R are individually formed in a substantially linear shape as viewed in a side elevational view, the left and right seat sub frame portions 24L and 24R are curved toward the inner side in the vehicle widthwise direction as viewed in top plan such that central regions in the extending direction approach each other. Proximal portions of the most approaching portions of the left and right seat sub frame portions 24L and 24R are coupled with each other by a cross pipe 25. Further, each of the rear regions of the seat sub frame portions 24L and 24R and the seat frame portions 23L and 23R are reinforced therebetween by a gusset frame 26 extending in a substantially horizontal direction.

Positions at the upper rear side of the left and right seat frame portions 23L and 23R with respect to the coupling portion with the left and right seat sub frame portions 24L and 24R are coupled with each other by a cross pipe 27. Further, a shock absorber bracket 28 for coupling upper end portions of the rear shock absorber 9 with each other is integrally attached by welding to a lower face region at the positions at the upper rear side of the left and right seat frame portions 23L and 23R with respect to the coupling portions with the left and right seat sub frame portions 24L and 24R. As depicted in FIG. 3, a bolt insertion hole 28*a* extending in the vehicle widthwise direction is provided in each shock absorber bracket 28.

Further, nuts 29A and 29B are integrally attached by welding or the like to rather lower front positions and upper rear side positions of the inner side faces in the vehicle widthwise direction of the left and right seat frame portions 23L and 23R with respect to the coupling portions with the seat sub frame portions 24L and 24R.

It is to be noted that, in the present embodiment, the main frames 14, the down frames 15, the rear frame 16 and so forth except the rear fender frame 60 from within the vehicle body frame F configure the vehicle body frame main body.

Figure 8:
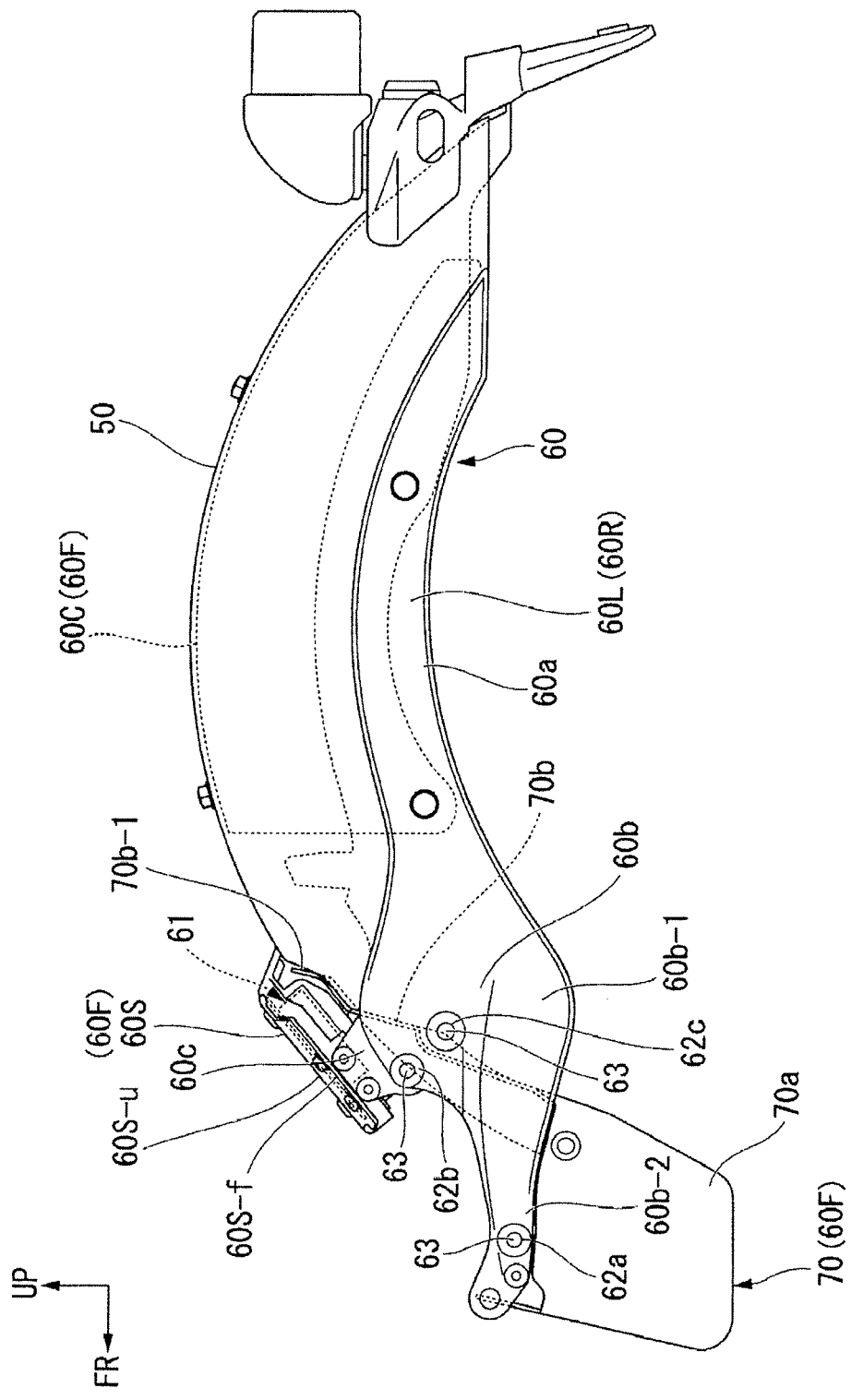
FIG. 8 is a side elevational view of several members of the saddle type vehicle according to the embodiment of the present invention.
Figure 9:
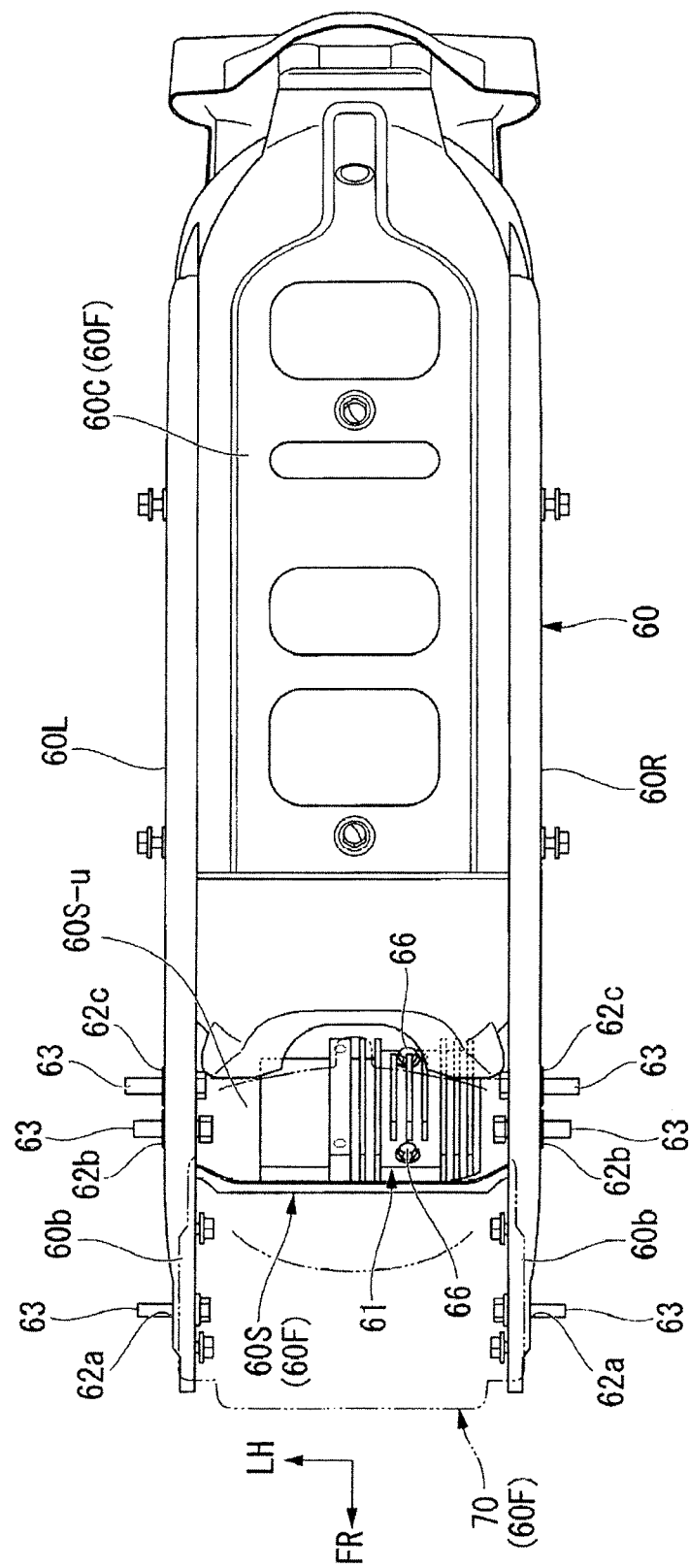
FIG. 9 is a bottom plan view of several members of the saddle type vehicle according to the embodiment of the present invention.
Figure 10:
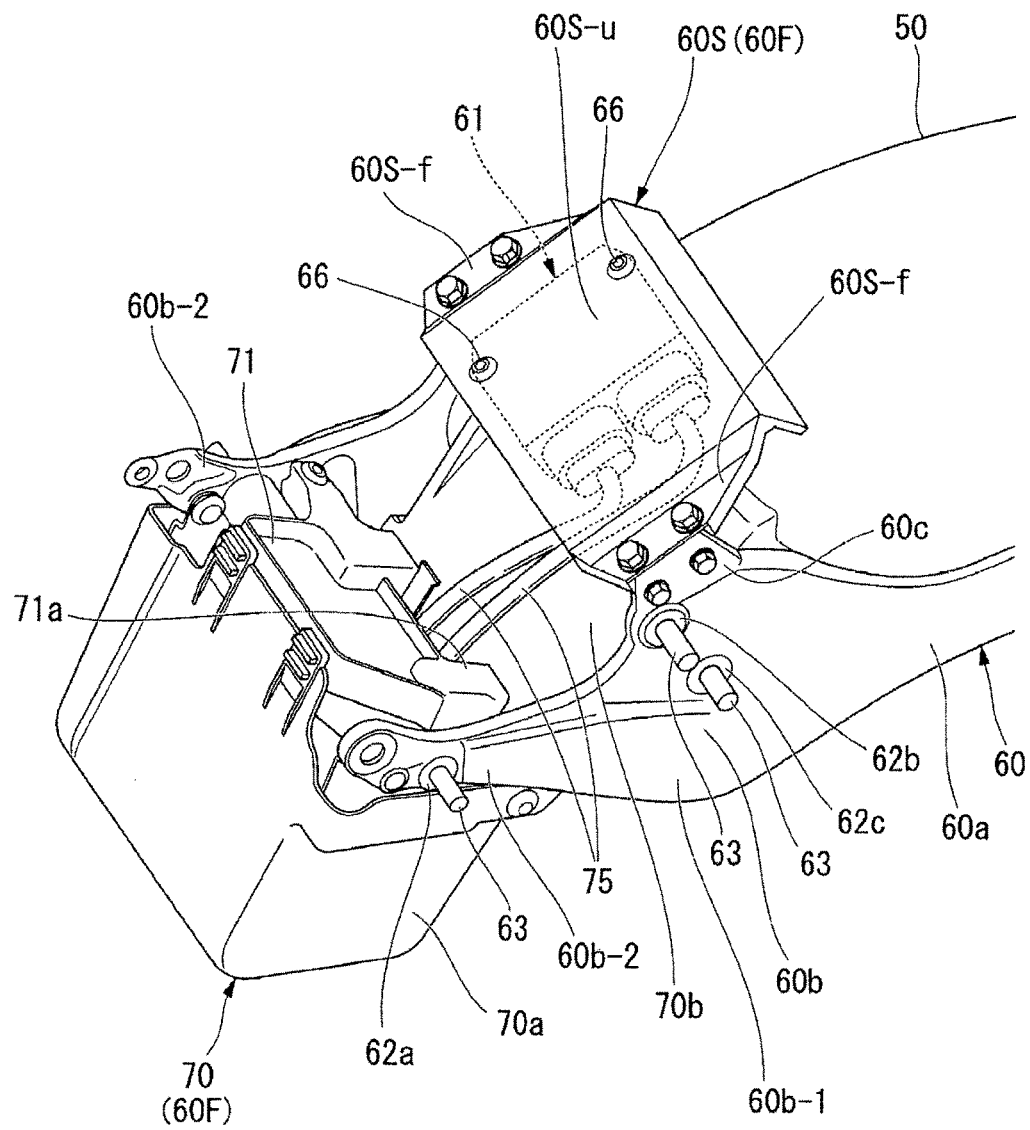
FIG. 10 is a perspective view of several members of the saddle type vehicle according to the embodiment of the present invention.
Figure 11:
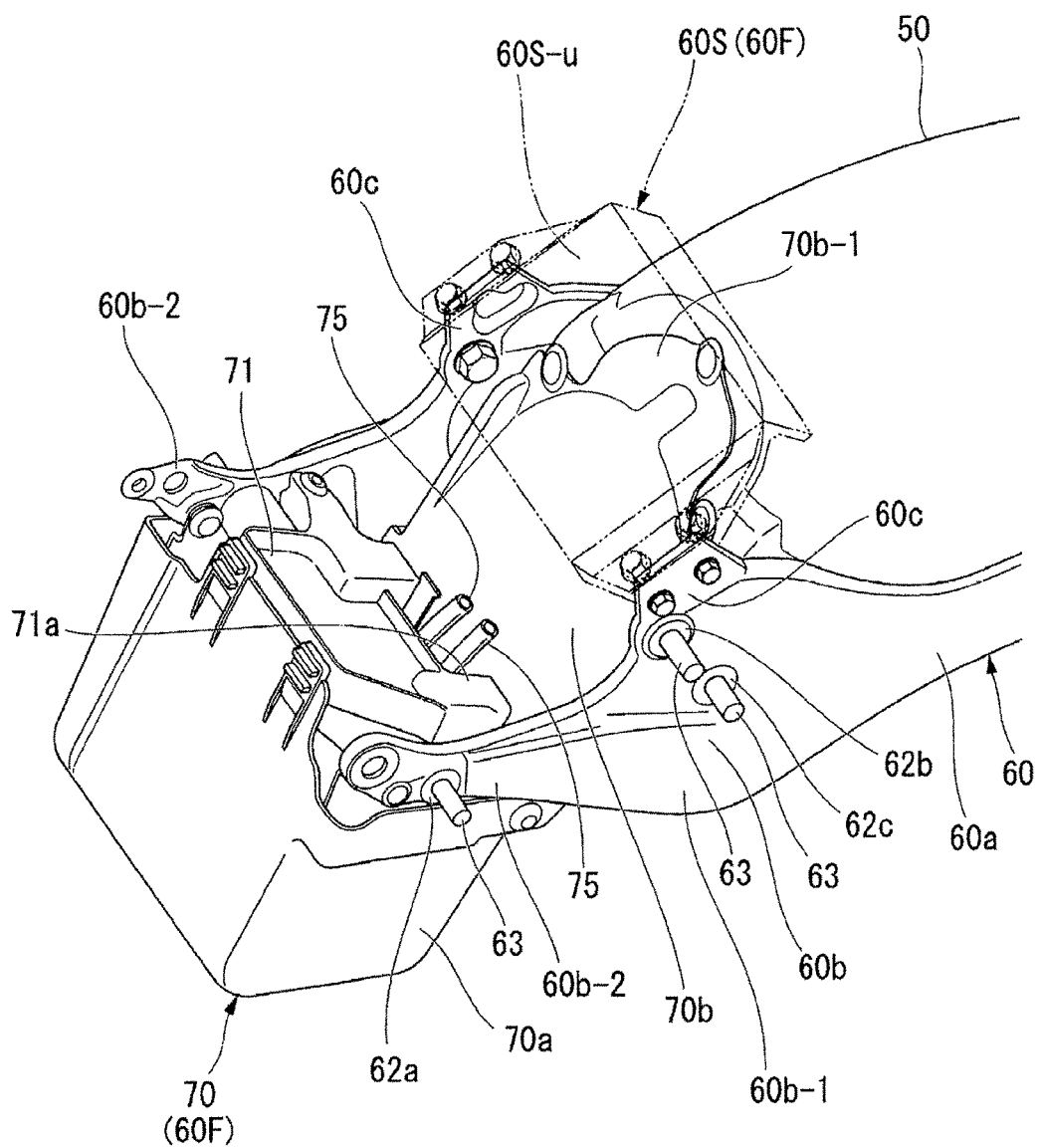
FIG. 11 is a perspective view of several members of the saddle type vehicle according to the embodiment of the present invention.

FIG. 8 is a view of the rear fender frame 60 and the rear fender 50 as viewed from the left side, and FIG. 9 is a view of the rear fender frame 60 and the rear fender 50 as viewed from the lower side. Further, FIG. 10 is a view of the rear fender frame 60 and the rear fender 50 as viewed from the upper left front side, and FIG. 11 is a view in which part of members of the rear fender frame 60 are removed and the rear fender frame 60 and the rear fender 50 are viewed from the upper left front side.

As depicted in FIGS. 5 and 8 to 11, the rear fender frame 60 includes a pair of side frame portions 60L and 60R disposed at both of the left and right sides in the vehicle widthwise direction and a cross frame portion 60F that couples the pair of side frame portions 60L and 60R with each other at the upper side. The cross frame portion 60F includes a center plate 60C, a seat supporting plate 60S and a battery box 70. In the present embodiment, the side frame portions 60L and 60R, center plate 60C, seat supporting plate 60S, and battery box 70 are individually formed from metal such as, for example, an aluminum alloy.

The left and right side frame portions 60L and 60R include an arcuate region 60a having an arcuate shape extending substantially along an upper shape of the rear wheel Wr as viewed in a side elevational view and a front region 60b extending forwardly from a front portion of the arcuate region 60a and fastened and fixed to the rear frame 16 side. An upper coupling piece 60c is curved in a crank shape to the inner side in the vehicle widthwise direction after extending upwardly and is integrally formed at an upper portion of a region adjacent to the arcuate region 60a of the front region 60b. The upper coupling pieces 60c of the left and right side frame portions 60L and 60R are coupled with each other by the seat supporting plate 60S extending along the vehicle widthwise direction. The seat supporting plate 60S is formed in a shape like a shallow box opened downwardly, and a joining flange 60S-f is provided along edge portions at both of the left and right sides in the vehicle widthwise direction. The left and right joining flanges 60S-f are fastened and fixed to the upper coupling pieces 60c of the left and right side frame portions 60L and 60R.

It is to be noted that a regulator 61 (regulator rectifier) that is an electrical component for converting alternating current generated by a generator not depicted into a direct current and outputting a voltage in a state in which the voltage is decreased to a level equal to or lower than a prescribed voltage is fastened and fixed by a bolt 66 to a lower face of an upper wall portion 60S-u of the seat supporting plate 60S.

Further, an upper face of the upper wall portion 60S-u of the seat supporting plate 60S is inclined so as to be directed to the upper front side in a state in which the rear fender frame 60 is attached to the rear frame 16. As depicted in FIG. 7, the upper face of the upper wall portion 60S-u of the seat supporting plate 60S contacts with a lower face at the rear portion of a bottom plate 32 of the seat 20 through a cushion member 33 or the like. Further, a side edge portion at the front side of the seat 20 contacts with the seat sub frame portions 24L and 24R and the upper face of the gusset frame 26.

Further, left and right side edge portions of the center plate 60C whose cross section has a substantially U-shape are fastened and fixed to the arcuate regions 60a of the left and right side frame portions 60L and 60R. The center plate 60C is held in contact with the inner side faces in the vehicle widthwise direction of the arcuate regions 60a of the side frame portions 60L and 60R such that the open side of the cross section of the U-shape is directed downwardly, and is fastened and fixed to the arcuate regions 60a in this state.

The rear fender 50 is placed from the upper side on the upper face of the center plate 60C and the outer side face of the arcuate region 60a of the left and right side frame portions 60L and 60R, and the rear fender 50 is fastened and fixed in this state.

Further, a first supported portion 62a, a second supported portion 62b, and a third supported portion 62c are provided in a spaced relationship in the forward and rearward direction and the upward and downward direction from each other in the front region 60b of the left and right side frame portions 60L and 60R. In the present embodiment, each of the first, second, and third supported portions 62a, 62b, and 62c is configured from a bolt insertion hole extending through the side frame portions 60L and 60R in the vehicle widthwise direction and a boss portion formed at an edge portion of the bolt insertion hole. A stem portion of a fastening bolt 63 is inserted from the inner side in the vehicle widthwise direction in the bolt insertion holes of the supported portions 62a, 62b, and 62c.

As depicted in FIG. 8, the front region 60b of the side frame portions 60L and 60R has a forwardly extending portion 60b-2 extending forwardly from a downwardly deflected position from within a base portion 60b-1 adjacent to the arcuate region 60a. The first supported portion 62a is disposed in the proximity of a front end portion of the forwardly extending portion 60b-2 of the side frame portions 60L and 60R. The second supported portion 62b is disposed at a position at the upper end side of the base portion 60b-1 of the side frame portions 60L and 60R in the proximity of the upper coupling piece 60c. Further, the third supported portion 62c is disposed at a position spaced rearwardly downwardly from the second supported portion 62b from within the base portion 60b-1 of the side frame portions 60L and 60R.

Further, the battery box 70 includes a box main body portion 70a that accommodates a battery, not depicted, inside thereof and has a substantially rectangular parallelepiped shape, and an inclined wall portion 70b extending obliquely rearwardly upwardly from an upper end portion of a rear wall of the box main body portion 70a. Further, an upper portion of the box main body portion 70a is covered with a box cover 71 mounted for opening and closing movement. An opening 71a, used when a battery harness 75 coupled with the battery in the battery box 70 is led out to the outside, is formed at a rear portion of the box cover 71.

In the battery box 70, an upper edge portion of the box main body portion 70a is disposed between the forwardly extending portions 60b-2 from within the front region 60b of the left and right side frame portions 60L and 60R, and is fastened and fixed to the left and right forwardly extending portions 60b-2 in this state. Further, in the battery box 70, the inclined wall portion 70b extends toward the upper rear side between the left and right side frame portions 60L and 60R in the state in which the box main body portion 70a is attached to the left and right forwardly extending portions 60b-2 in such a manner as described above. A joining piece 70b-1 is provided at an extending end of the inclined wall portion 70b, and the joining piece 70b-1 is fastened and fixed to a front edge portion of the rear fender 50.

Accordingly, the inclined wall portion 70b of the battery box 70 closes up a space between the rear end portion of the box main body portion 70a and the front end portion of the rear fender 50. Further, the inclined wall portion 70b traverses in the forward and rearward direction below the seat supporting plate 60S and covers a lower part of the regulator 61 attached to the lower face of the upper wall portion 60S-u of the seat supporting plate 60S.

Further, as depicted in FIG. 10, the battery harnesses 75 led out from the box cover 71 at the upper portion of the battery box 70 are laid along the upper face of the inclined wall portion 70b and are electrically coupled with the regulator 61 below the seat supporting plate 60S.

As depicted in FIGS. 4 to 7, in a state in which the rear fender 50 is attached to the upper portion of the rear fender frame 60, the front region 60b of the side frame portions 60L and 60R of the rear fender frame 60 is inserted between the left and right seat frame portions 23L and 23R of the rear frame 16, and the rear fender frame 60 is fixed to the rear frame 16 in this state.

More particularly, the left and right side frame portions 60L and 60R of the rear fender frame 60 are disposed such that the first supported portion 62a and the second supported portion 62b of the front region 60b are opposed to the faces at the inner side in the vehicle widthwise direction of the corresponding left and right seat frame portions 23L and 23R and the third supported portion 62c is opposed to the face at the inner side in the vehicle widthwise direction of the shock absorber bracket 28. The first supported portion 62a and the second supported portion 62b are fixed to the inner sides in the vehicle widthwise direction of the corresponding seat frame portions 23L and 23R by fastening using the bolts 63 and nuts 29A and 29B in the state just described. Further, the third supported portion 62c is co-fastened by the bolt 63 and a nut 64, which serve as fastening means, to the shock absorber bracket 28 together with the upper end portion of the rear shock absorber 9 in a state in which the upper end portion of the rear shock absorber 9 is disposed in an overlapping relationship with a face at the outer side in the vehicle widthwise direction of the shock absorber bracket 28 attached to a rear portion of the left and right seat frame portions 23L and 23R.

The left and right front regions 60b of the rear fender frame 60 are supported and fixed with high rigidity to the rear frame 16 at the three points (first, second, and third supported portions 62a, 62b, and 62c) spaced from each other in the forward and rearward direction and the upward and rearward direction of the vehicle body as described above.

While the left and right front regions 60b of the rear fender frame 60 are fastened and fixed to the left and right seat frame portions 23L and 23R and the shock absorber bracket 28 as described above, in this state, the seat supporting plate 60S at the front side of the rear fender frame 60 is placed between the left and right seat frame portions 23L and 23R and projects to the upper front side with respect to the seat frame portions 23L and 23R. At this time, the upper face of the upper wall portion of the seat supporting plate 60S is disposed substantially in parallel to the upper face of the seat frame portions 23L and 23R.

The left and right seat sub frame portions 24L and 24R of the rear frame 16 extend toward the upper front side from a lower front position P (refer to FIGS. 4 and 6) with respect to a portion on the seat frame portions 23L and 23R at which the seat supporting plate 60S is disposed.

Further, the seat 20 is attached for opening and closing movement to the seat sub-frame portions 24L and 24R around the center at a hinge portion not depicted provided at the front end side. Further, in a state in which the rear side of the seat 20 is placed down to close with the seat 20, the bottom plate 32 of the lower face at the rear side of the seat 20 is supported on the upper face of the upper wall portion 60S-u of the seat supporting plate 60S and a lower side face at the front side of the seat 20 is supported on the left and right seat sub frame portions 24L and 24R.

As described above, in the motorcycle 1 according to the embodiment, the front region 60b of the rear fender frame 60 is fastened and fixed at the two front and rear locations (the first supported portion 62a and the second supported portion 62b) to the seat frame portions 23L and 23R of the rear frame 16, and is fastened and fixed at one location at the rear side to the shock absorber bracket 28 attached to the left and right seat frame portions 23L and 23R. Accordingly, where the structure just described is adopted, the rear fender frame 60 can be supported on the rear frame 16 with high rigidity without limiting the degree of freedom of the shape of the rear frame 16 in comparison with an alternative case in which the front region 60b of the rear fender frame 60 is fixed only to a pipe material portion of the rear frame 16.

In addition, in the motorcycle 1 according to the embodiment, the front region 60b of the rear fender frame 60 is co-fastened together with the upper end portion of the rear shock absorber 9 to the shock absorber bracket 28. Therefore, the number of fastening members such as bolts and nuts can be decreased and the rear fender frame 60 and the rear shock absorber 9 can be assembled with a high efficiency to the rear frame 16.

Further, in the motorcycle 1 according to the embodiment, the first supported portion 62a and the second supported portion 62b of the rear fender frame 60 are attached to the portion at the inner side in the vehicle widthwise direction of the left and right seat frame portions 23L and 23R. Therefore, the portion at the outer side in the vehicle widthwise direction of the first supported portion 62a and the second supported portion 62b of the rear fender frame 60 is covered with the left and right seat frame portions 23L and 23R such that it is less likely to be viewed from the outside. Accordingly, by adopting the structure just described, the appearance of the vehicle can be improved.

Further, in the motorcycle 1 according to the embodiment, the pair of left and right side frame portions 60L and 60R of the rear fender frame 60 are coupled with each other by the cross frame portion 60F (center plate 60C, seat supporting plate 60S, and battery box 50) and the seat supporting plate 60S from within the cross frame portion 60F supports the lower face at the rear side of the seat 20. Therefore, by adopting the structure just described, the lower face at the rear side of the seat 20 can be supported in stability by the seat supporting plate 60S and the rigidity of the front region 60b of the rear fender frame 60 can be enhanced with a high efficiency. Further, where the structure is adopted, the number of parts can be decreased in comparison with an alternative case in which a member for supporting the lower face at the rear side of the seat 20 and another member for coupling the front regions of the left and right side frame portions 60L and 60R with each other are provided separately from each other. Accordingly, a reduction in the fabrication cost and a reduction in the weight of the vehicle can be implemented.

More particularly, while the seat supporting plate 60S in the motorcycle 1 according to the embodiment is formed in a substantially box-like shape open downwardly, the rigidity of the seat supporting plate 60S, particularly, the rigidity in a twisting direction, is enhanced. Therefore, the rigidity at the front side of the rear fender frame 60 can be enhanced with a high efficiency. Further, since the seat supporting plate 60S is formed in a substantially box-like shape open downwardly, different parts can be disposed at the lower face side of the seat supporting plate 60S and the disposed members can be advantageously protected.

Further, in the case of the motorcycle 1 according to the embodiment, the battery box 70 configuring the cross frame portion 60F is attached in the proximity at the front side of the installation portion of the seat supporting plate 60S in the front region of the left and right side frame portions 60L and 60R and the regulator 61 that is an electrical component is attached to the lower face of the seat supporting plate 60S. Therefore, the front regions of the left and right side frame portions 60L and 60R are coupled with each other in parallel to each other by the seat supporting plate 60S and the battery box 70, and the rigidity of the front edge portion of the rear fender frame 60 is enhanced with a high efficiency. Further, since a battery accommodated in the battery box 70 and the regulator 61 attached to the lower face of the seat supporting plate 60S are disposed in a neighboring relationship with each other, the battery harness 75 for coupling the battery and the regulator 61 with each other can be configured short as depicted in FIG. 10.

Further, since, in this structure, the regulator 61 is disposed on the lower face of the seat supporting plate 60S, the regulator 61 can be protected by the seat supporting plate 60S while effectively using a space below the seat supporting plate 60S. It is to be noted that the electrical component to be disposed below the seat supporting plate 60S is not limited to the regulator 61 and various different electrical components may be disposed.

Further, in the motorcycle 1 according to the embodiment, the battery box 70, configuring the cross frame portion 60F, includes the box main body portion 70a wherein the battery is accommodated. The inclined wall portion 70b extends obliquely rearwardly and upwardly from the rear portion of the box main body portion 70a and covers the lower side of the regulator 61. Therefore, the battery box 70 can prevent rainwater, gravel, dust or the like stirred up from the rear wheel Wr upon operating the vehicle from scattering to the regulator 61.

In the motorcycle 1 according to the embodiment, the rear frame 16 includes the pair of left and right seat frame portions 23L and 23R that support the rear region of the seat 20 thereon and the pair of left and right seat sub frame portions 24L and 24R that support the lower side face at the front side of the seat 20 thereon. The seat supporting plate 60S is disposed between the left and right seat frame portions 23L and 23R. Further, the left and right seat sub frame portions 24L and 24R extend from the lower front position with respect to the portion of the seat frame portions 23L and 23R at which the seat supporting plate 60S is disposed toward the upper front side. Therefore, the extending length of the seat sub frame portions 24L and 24R can be reduced in comparison with that in an alternative case wherein the seat sub frame portions 24L and 24R extend forwardly and in a substantially horizontal direction from the proximity of the portion of the seat frame portions 23L and 23R wherein which the seat supporting plate 60S is disposed. Accordingly, by adopting the structure as just described, the weight of the seat sub frame portions 24L and 24R can be reduced and reduction of the weight of the entire vehicle can be implemented.

It is to be noted that the present invention is not limited to the embodiment specifically described above, and various design variations and modifications can be made without departing from the scope of the present invention. For example, while, in the embodiment described above, the three supported portions 62a, 62b, and 62c are provided at both of the left and right sides of the front region of the rear fender frame 60, the number of supported portions is not limited to three for each of the left and right sides and may be determined arbitrarily only if a plurality of supported portions are used. Further, while a seat and steps for a rear passenger are removed in the motorcycle 1 according to the embodiment, a seat and steps for a rear passenger may be provided.

Vehicles in general on which a driver rides astride the vehicle body are included in the saddle type vehicle, and not only a motorcycle (including a moped and a scooter type vehicle) but also a three-wheeled vehicle wherein two front wheels and one rear wheel are provided are included.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle comprising:
a rear fender for covering an upper portion of a rear wheel;
a vehicle body frame main body at least part of which is disposed above a front portion of the rear wheel; and
a rear fender frame that supports the rear fender wherein a front region thereof is attached to the vehicle body frame main body;
a shock absorber bracket attached to the vehicle body frame main body;
a rear shock absorber including an upper end portion attached to the shock absorber bracket, said rear shock absorber supports the rear wheel;
the rear fender frame includes a plurality of supported portions in a front region thereof;
at least part of the plurality of supported portions is co-fastened to the shock absorber bracket together with an upper end portion of the rear shock absorber and the remaining supported portions are fixed to the vehicle body frame main body;
the rear fender frame includes a pair of left and right side frame portions disposed on both sides in the vehicle widthwise direction and a cross frame portion that couples the side frame portions with each other;
at least part of the cross frame portion is configured from a seat supporting plate that supports a lower face at a rear side of a seat on which an occupant is to be seated;
the cross frame portion includes a battery box attached in proximity of an installation portion of the seat supporting plate from within a front edge portion of the pair of left and right side frame portion and configured for accommodating a battery; and
an electrical component is disposed on a lower face of the seat supporting plate.

2. The saddle vehicle according to claim 1, wherein the remaining supported portions are fixed to an inner side portion in a vehicle widthwise direction of the vehicle body frame main body.

3. The saddle vehicle according to claim 2, wherein:
the rear fender frame includes a pair of left and right side frame portions disposed on both sides in the vehicle widthwise direction and a cross frame portion that couples the side frame portions with each other; and
at least part of the cross frame portion is configured from a seat supporting plate that supports a lower face at a rear side of a seat on which an occupant is to be seated.

4. The saddle vehicle according to claim 1, wherein the seat supporting plate is formed in a substantially box-like shape open downwardly.

5. The saddle vehicle according to claim 4, wherein:
the vehicle body frame main body includes a pair of left and right seat frame portions that extend from a lower front position of the seat toward the rear side of the seat, and a pair of left and right seat sub frame portions that extend from the seat frame portions toward an upper front side of the vehicle and support the lower face of a side portion at a front side of the seat;
the seat supporting plate that supports the lower face at the rear side of the seat is disposed between the pair of left and right seat frame portions; and
the seat sub frame portions extend toward the upper front side from a lower front position than a portion of the seat frame portions at which the seat supporting plate is disposed.

6. The saddle vehicle according to claim 1, wherein the battery box includes a box main body portion that accommodates the battery in the inside thereof and an inclined wall portion that extends obliquely rearwardly upwardly from a rear portion of the box main body portion and covers a lower portion of the electrical component.

7. The saddle vehicle according to claim 6, wherein:
the vehicle body frame main body includes a pair of left and right seat frame portions that extend from a lower front position of the seat toward the rear position of the seat, and a pair of left and right seat sub frame portions that extend from the seat frame portions toward an upper front side and support the lower face of a side portion at a front side of the seat;
the seat supporting plate that supports the lower face at the rear side of the seat is disposed between the pair of left and right seat frame portions; and
the seat sub frame portions extend toward the upper front side from a lower front position than a portion of the seat frame portions at which the seat supporting plate is disposed.

8. The saddle vehicle according to claim 1, wherein:
the vehicle body frame main body includes a pair of left and right seat frame portions that extend from a lower front position of the seat toward the rear side of the seat, and a pair of left and right seat sub frame portions that extend from the seat frame portions toward an upper front side of the vehicle and support the lower face of a side portion at a front side of the seat;
the seat supporting plate that supports the lower face at the rear side of the seat is disposed between the pair of left and right seat frame portions; and
the seat sub frame portions extend toward the upper front side from a lower front position than a portion of the seat frame portions at which the seat supporting plate is disposed.

9. A saddle vehicle comprising:
a rear fender for covering an upper portion of a rear wheel;
a vehicle body frame main body at least part of which is disposed above a front portion of the rear wheel; and
a rear fender frame that supports the rear fender wherein a front region thereof is attached to the vehicle body frame main body;
a swing arm pivotally supported on said vehicle body frame main body, said swing arm operatively supports said rear wheel;
a shock absorber bracket attached to the vehicle body frame main body;
a rear shock absorber including an upper end portion attached to the shock absorber bracket and a lower end portion operatively connected to the swing arm;
the rear fender frame includes a plurality of supported portions in a front region thereof;
at least part of the plurality of supported portions is co-fastened to the shock absorber bracket together with an upper end portion of the rear shock absorber and the remaining supported portions are fixed to the vehicle body frame main body;
the rear fender frame includes a pair of left and right side frame portions disposed on both sides in the vehicle widthwise direction and a cross frame portion that couples the side frame portions with each other;
at least part of the cross frame portion is configured from a seat supporting plate that supports a lower face at a rear side of a seat on which an occupant is to be seated;
the cross frame portion includes a battery box attached in proximity of an installation portion of the seat supporting plate from within a front edge portion of the pair of left and right side frame portion and configured for accommodating a battery; and
an electrical component is disposed on a lower face of the seat supporting plate.

10. The saddle vehicle according to claim 9, wherein the remaining supported portions are fixed to an inner side portion in a vehicle widthwise direction of the vehicle body frame main body.

11. The saddle vehicle according to claim 9, wherein the seat supporting plate is formed in a substantially box-like shape open downwardly.

12. The saddle vehicle according to claim 11, wherein:
the vehicle body frame main body includes a pair of left and right seat frame portions that extend from a lower front position of the seat toward the rear position of the seat, and a pair of left and right seat sub frame portions that extend from the seat frame portions toward an upper front side of the vehicle and support the lower face of a side portion at a front side of the seat;
the seat supporting plate that supports the lower face at the rear side of the seat is disposed between the pair of left and right seat frame portions; and
the seat sub frame portions extend toward the upper front side from a lower front position than a portion of the seat frame portions at which the seat supporting plate is disposed.

13. The saddle vehicle according to claim 9, wherein the battery box includes a box main body portion for accommodating the battery and an inclined wall portion extending obliquely rearwardly upwardly from a rear portion of the box main body portion for covering a lower portion of the electrical component.

14. The saddle vehicle according to claim 9, wherein:
the vehicle body frame main body includes a pair of left and right seat frame portions that extend from a lower front position of the seat toward the rear position of the seat, and a pair of left and right seat sub frame portions that extend from the seat frame portions toward an upper front side of the vehicle and support the lower face of a side portion at a front side of the seat;

the seat supporting plate that supports the lower face at the rear side of the seat is disposed between the pair of left and right seat frame portions; and the seat sub frame portions extend toward the upper front side from a lower front position than a portion of the seat frame portions at which the seat supporting plate is disposed.

* * * * *